July 15, 1941.　　　J. J. GLEASON　　　2,248,983
AIR CONDITIONING AND REFRIGERATING UNIT
Filed Aug. 10, 1939
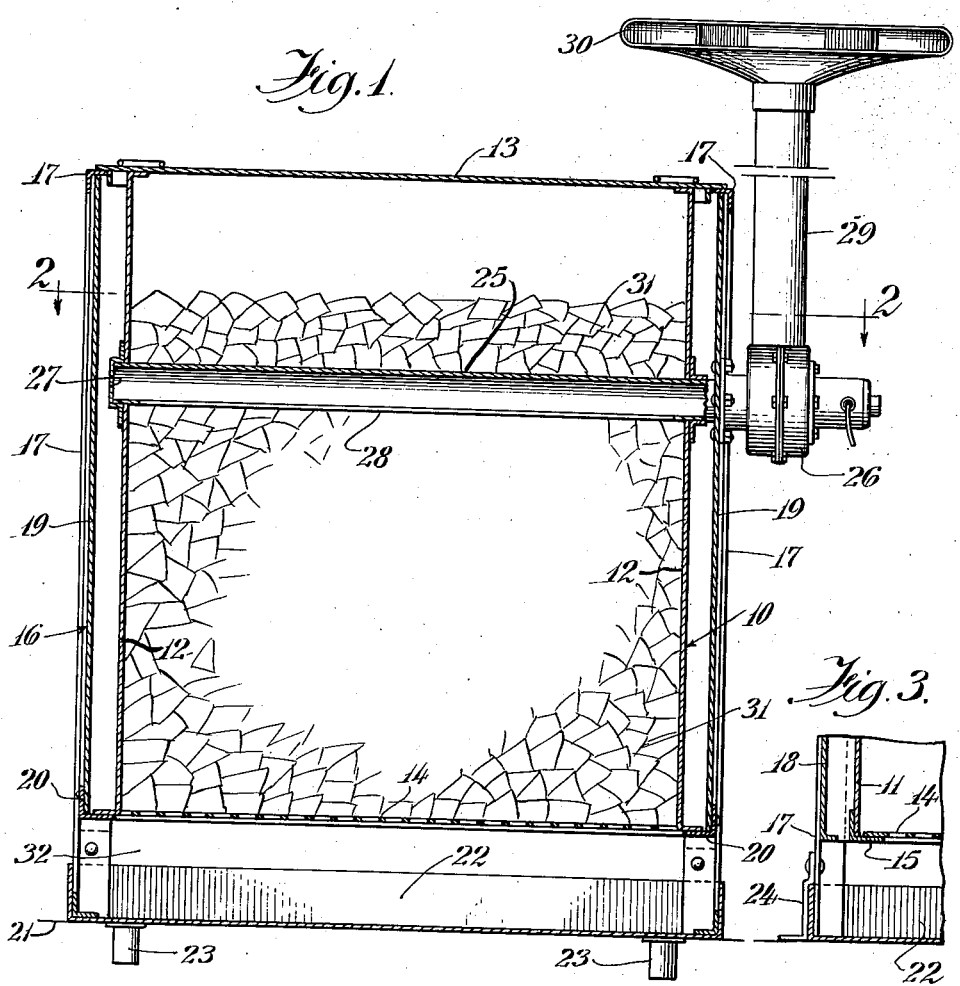
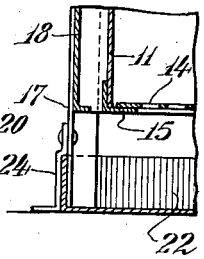
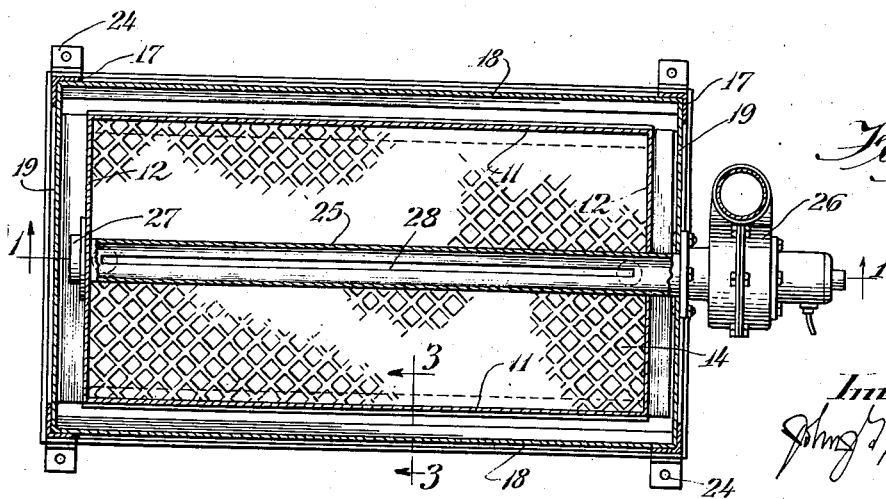
Inventor:
John J. Gleason Patented July 15, 1941

2,248,983

UNITED STATES PATENT OFFICE 2,248,983

AIR CONDITIONING AND REFRIGERATING UNIT

John J. Gleason, Chicago, Ill.

Application August 10, 1939, Serial No. 289,427

7 Claims. (Cl. 62—133)

This invention relates to an improved air-conditioning and refrigerating unit adapted for use in and in conjunction with an enclosed area such as a vehicle body, storage chambers, shop or work rooms, or the like.

The object of my invention is to provide a unitary apparatus for circulating and conditioning large volumes of air by drawing the air from the body in which the unit is confined, upwardly through a body of ice particles and delivering humidified and chilled air to the upper portion of the body enclosure in heat exchange relationship with the warmest air thereof.

A further object of my invention is to provide a unitary apparatus which is self contained and which may be rapidly and conveniently placed or mounted into desired position, or withdrawn from position or use for several requirements.

A further object of my invention is to provide an air conditioning and refrigerating unit of the type which utilizes ice as the cooling and conditioning medium wherein maximum use is made of a minimum amount of ice and whereby the maximum amount of ice required for efficient refrigeration of the circulated air is substantially maintained over long periods of time by providing a reserve of ice particles which are self-feeding into effective position as the ice melts.

My improved unit is particularly adapted for use in the transportation of food products in trucks, to both condition and ice-refrigerate the air therein. The air in the lower part of the truck body is drawn into the refrigerator container at the bottom of the unit through a shower of dripping water from the melting ice by a centrifugal motor blower, which driving operation of the truck is motivated by the storage battery thereof and is capable of delivering approximately one hundred cubic feet of air per minute. The air continues upward with a blast against, around and through a large ice area of innumerable ice lumps and the now well-chilled air is drawn into the suction duct embedded in the ice of the container, continuing to the upper part of the truck body which is hardest to cool. In its passage it filters through every space, creating a continuous even distribution and circulation of the refrigerated, washed and humidified air through all parts of the truck body interior.

Thus is maintained a constant flow of washed pure air properly humidified and cooled which keeps the food products in perfect condition, sweet, fresh and wholesome, and at the same time tends to prevent excess shrinkage and discoloration, and is equally efficient over long hauls or short ones with frequent stops and openings.

Other objects relate to details of construction and arrangement of parts which will be apparent from a consideration of the following specification and drawing, wherein:

Fig. 1 is a vertical section of my air conditioning and refrigerating apparatus unit, taken on the line 1—1 of Fig. 2.

Fig. 2 is a section on the line 2—2 of Fig. 1.

Fig. 3 is a fragmentary section on the line 3—3 of Fig. 2.

Referring to the drawing, the receptacle 10 for containing ice particles is rectangular and preferably of greater width than thickness, and comprises side walls 11, end walls 12, a cover 13 and a foraminated bottom 14. The bottom 14 may be formed of expanded metal or the like foraminated construction and is suitably secured to the receptacle preferably as shown, by being welded to the angle iron members 15 extending along the lower edges of the side walls 11.

Supporting and embracing the ice receptacle in spaced apart relationship is the enclosure generally indicated as 16, which comprises a rectangular angle iron frame work 17, to which is suitably secured as by welding, the side walls 18 and end walls 19. Extending endwise between the vertical portions of the frame 17 are the angular tie members 20 in spaced apart relationship to the mounting base or floor 21. The ice containing receptacle is supported on the tie members 20, preferably in the manner shown, that is, by means of the outwardly projecting flanges from the sides 12 of the receptacle, so that the foraminated bottom 14 is held above the floor 21. The sides 18 and ends 19 of the enclosure are of substantially the same height as the sides 11 and ends 12 of the receptacle, and are spaced apart from them so as to leave a space between the two portions to provide air insulation for the ice receptacle and an atmospheric moisture condensation collection chamber.

Positioned below the foraminated bottom 14 is the drip pan 22, which may be provided with a pair of drain pipes 23, one adjacent each side and which arrangement is particularly suited for use in moving vehicles to insure rapid drainage and to compensate for lateral tilt. As shown, the base portion of the angle iron frame wall 17 extends into the drip pan, and although not shown, it is to be understood that the drip pan may be positioned between the corner pieces of the frame. The four corners of frame 16 may also, as shown, be suitably provided with floor brackets 24 for the purpose of fixing the entire apparatus in desired position, and may additionally serve as supporting legs. It is to be understood, however, that the apparatus need not necessarily be supported on the floor by leg pieces, but may otherwise be positioned, as for example, against a wall by means of suitable supports, brackets and the like.

Extending through an end wall 19 of the enclosure 16, and an adjacent end wall 12 of the receptacle 10, is the suction duct 25. This duct is preferably elongated to extend across the width of the receptacle 10, one end being engaged to an exhaust fan, such as the compact electrically driven motor-blower 26 of the centrifugal type, and the opposed end closed as at 27. While it is to be understood that the suction duct may be of any suitable form, I preferably use the tubular construction shown, the mouth, 28, thereof being in the form of an elongated downwardly opening slot. An exhaust duct 29 extends from the motor-blower 26 and terminates suitably in the flared mouth 30 upwardly of the cover 13 closing the ice receptacle, and preferably the mouth 30 is positioned adjacent the uppermost portion of the chamber in which the apparatus is positioned.

In operation, lumps or cracked ice particles 31 are placed in the receptacle 10 and the cover 13 tightly closed down. The motor and blower may be operated by the storage battery of a motor vehicle, such as a truck, or may by suitable attachment be driven by a conventional higher voltage electric outlet when utilized in combination with a fixed refrigeration chamber, or when a motor vehicle is undergoing loading or storage at its garage. Operation of the motor blower will cause the suction duct 25, through its mouth 28, to draw air from the refrigeration chamber through the space 32 between the floor 21 or drip pan 22 and the foraminated bottom 14. The suction of the air, from the lower portion of the chamber, causes it to pass through space 32 in contact first with the drippings from the ice 31 to wash and humidify it, and thence upwardly through the foraminated bottom 14 and the ice in the receptacle to suction duct 25.

The mouth 28 of suction duct 25 is positioned a sufficient distance above the bottom 14 for the air in passing around and over the ice particles to become well chilled in its upward passage. I have found that in a distance of approximately 16 to 18 inches of upward passage a maximum chilling effect is maintained when delivering approximately 100 cubic feet of chilled air per minute. Thus for efficient operation the receptacle 10 should be filled with ice up to the suction duct 25. To maintain this efficiency the receptacle 10 is filled with ice particles well above the suction duct, and the apparatus for this purpose of ice storage may be of greater relative height than illustrated, and as the ice melts in the lower portion of the chamber due to heat exchange, the reserve in the upper portion lowers itself.

After the air from the refrigeration chamber has been thus conditioned, it is delivered upwardly and outwardly through the duct 29 and mouth 30 to the upper or ceiling zone of the refrigeration chamber so that it may cool the hottest portion thereof and be placed in heat exchange relationship with the warmest air in the chamber to most efficiently and rapidly refrigerate it and keep it in such condition.

It will be apparent from the foregoing that various details of construction and the arrangement of parts may be varied without departing from the true scope of my invention, and I therefore do not wish to be restricted thereto except as so limited by the following claims.

I claim as my invention:

1. A device of the class described comprising a closed receptacle adapted to contain ice and provided with air inlet means at the base thereof, a suction duct extending into said receptacle and having its mouth therein extending transversely and intermediate the height of the receptacle to provide a limited distance of travel for the air in cooling thereof and to provide ice storage space above said duct, a discharge duct opening outwardly of and above said receptacle, and means for drawing air from the inlet of said receptacle and into said suction duct and for discharging the air through said discharge duct.

2. A device of the class described comprising a closed receptacle adapted to contain ice and provided with air inlet means at the base thereof, means for holding said receptacle in elevated position, a suction duct extending into said receptacle and having its mouth therein extending transversely and intermediate the height of the receptacle to provide a limited distance of travel for the air in cooling thereof and to provide ice storage space above said duct, a discharge duct opening outwardly of and above said receptacle, and means for drawing air from the inlet of said receptacle and into said suction duct and for discharging the air through said discharge duct.

3. In an air cooling unit for forcibly drawing air through a confined body of ice particles and circulating it through a chamber, an ice receptacle comprising walls, a cover, and a foraminated bottom, means for holding said receptacle in spaced relation to the base of said chamber, a suction duct extending into said receptacle and formed with an elongated horizontally extending mouth positioned intermediate of the height of said receptacle to provide a limited distance of travel for the air in cooling thereof and to provide ice storage space above said duct, a discharge duct extending upwardly of said receptacle, and means for causing air to be drawn through said receptacle from the foraminated bottom thereof to said suction duct and to discharge the air through said discharge duct.

4. A unitary apparatus for conditioning, refrigerating and circulating air in a chamber, comprising a closed receptacle for containing ice particles, the said receptacle being provided with a cover and a foraminated bottom, means for holding said receptacle in spaced relation to a mounting base therefor, a suction duct having its mouth extending transversely of the interior and intermediate the height of said chamber opening in a downwardly direction and spaced approximately one and one-half feet from the foraminated bottom thereof, a discharge duct extending from said receptacle and having its mouth positioned upwardly thereof, and means for causing air to be drawn through said receptacle from the foraminated bottom thereof to said suction duct and to discharge the air through said discharge duct.

5. A unitary apparatus for conditioning, refrigerating and circulating air in an enclosed chamber, comprising a receptacle for containing ice particles, the said receptacle being provided with a cover and a foraminated bottom, a frame for supporting said receptacle in elevated position, walls on said frame extending around the walls of the receptacle in spaced relation thereto and being vertically substantially coextensive therewith, a suction duct having its mouth extending transversely of the interior of said chamber opening in a downwardly direction and spaced approximately sixteen to eighteen inches from the foraminated bottom and intermediate the height thereof, a discharge duct extending from said receptacle and having its mouth positioned upwardly thereof, and means for causing air to be drawn through said receptacle from the foraminated bottom thereof to said suction duct and to discharge the air through said discharge duct.

6. The combination with an enclosed vehicle truck body or the like mobile chamber of a unitary apparatus for conditioning, refrigerating and circulating the air content thereof, comprising a receptacle for containing ice particles comprising a rectangular body having side and end walls, a cover and a foraminated bottom, a frame supporting said receptacle in spaced relation to the floor of said chamber, side and end walls on said frame in spaced apart relation to the side and end walls of said receptacle and to the floor of said chamber, an exhaust fan having an inlet duct provided with an elongated slot-like mouth extending transversely between the ends walls of the receptacle and fixedly positioned intermediate the height thereof, and an outlet duct extending from said exhaust fan having its mouth positioned adjacent the top of said chamber.

7. A unitary apparatus for conditioning, refrigerating and circulating air in an enclosed chamber; comprising a receptacle for containing ice particles, the said receptacle having side walls, end walls, a cover, and a foraminated base portion, a frame for supporting said receptacle in elevated position, a drip pan in spaced relation to said base, a suction duct extending transversely between the end walls of said receptacle having an elongated inlet opening spaced from said bottom and positioned intermediate the height of the receptacle adapted to draw air from adjacent the lower portion of said chamber through the space formed between the drip pan and the foraminated bottom and through the latter through and against ice particles contained in the receptacle, the said suction duct opening being spaced from the foraminated bottom a distance sufficient to permit the incoming air to be chilled to a maximum degree and to provide ice storage space thereabove, and an exhaust duct extending from said fan means having its mouth positioned adjacent the upper portion of said chamber and adapted to deliver chilled air thereto in heat exchange relationship with the warmest air thereof.

JOHN J. GLEASON.